March 29, 1960 E. McPHAIL LEYTON 2,930,842
PHASE DETECTING AND AUTOMATIC PHASING CIRCUITRY ESPECIALLY FOR COLOR TELEVISION APPARATUS
Filed July 29, 1955 3 Sheets-Sheet 1

INVENTOR.
ERIC M. LEYTON
BY [signature]
ATTORNEY

INVENTOR.
ERIC M. LEYTON
BY
[signature]
ATTORNEY

INVENTOR.
ERIC M. LEYTON
BY
[signature]
ATTORNEY

United States Patent Office 2,930,842

Patented Mar. 29, 1960

2,930,842

PHASE DETECTING AND AUTOMATIC PHASING CIRCUITRY ESPECIALLY FOR COLOR TELEVISION APPARATUS

Eric McPhail Leyton, Princeton, N.J., assignor to Radio Corporation of America, a corporation of Delaware Application July 29, 1955, Serial No. 525,264

4 Claims. (Cl. 178—5.4)

The invention relates to phase detecting circuitry and it particularly pertains to the measurement and maintenance of the phase relationship of the transmitted and received chrominance subcarrier wave at different points of color television systems.

There are many applications involving alternating current electric waves which require the determination of the phase relationship between two electric waves. An example of such an application is found in present day color television broadcasting.

In color television systems operating in accordance with the standards for U.S. broadcast color television promulgated by the Federal Communications Commission and released as FCC Public Notice No. 53–1663 on December 17, 1953, the composite color television visual signal, which is transmitted and received, comprises a carrier wave which is modulated by a luminance signal, a chrominance signal, deflection synchronizing pulses and color bursts. The luminance signal is intended to have exclusive control of the luminance of the image and is similar to the present black-and-white or monochrome signal. The chrominance signal is a phase- and amplitude-modulated subcarrier wave of frequency corresponding to one of the higher luminance signal frequencies. The deflection synchronizing pulses are utilized for the control of the electron beam scanning the raster at the receiver. The color bursts are periodic bursts of the unmodulated color subcarrier wave following the deflection synchronizing pulses and are employed for effecting phase and synchronizing control of the apparatus by which the chrominance subcarrier wave is demodulated.

In such systems, it is frequently desired to relay the composite color signal picked up at one point to a distant point for further processing. This relaying of the composite color signal often may subject a signal to various types of interference effects which tend to distort portions, or all, of the composite signal, and often may attenuate the video signal to such an extent that the amplitude level may be too low for the signal to be used directly. In such instances, a video signal "stabilizing" amplifier is used to modify the composite color signal as received from a remote point. In general, such stabilizing amplifiers include circuits for suitably amplifying the video signal and for restoring the synchronizing pulses to their proper forms and amplitudes. Other circuits are provided for reinserting the color bursts in the proper phase relationship and following the deflection synchronizing pulses.

Because of the relationship in time and in amplitude between the synchronizing pulse signals and the color burst of subcarrier wave oscillations, it is generally considered desirable to strip the received color burst from the incoming signal and insert a new color burst derived from a local color burst generating circuit in the outgoing composite color signal. This type of stabilizing amplifier involves difficulty in maintaining a sufficiently accurate phase lock of the locally generated color bursts with the incoming color bursts and insuring that the proper adjustment is maintained over long periods of time. Phase measuring circuitry used in conjunction with such apparatus is known but a separate source of reference signal must be available for proper operation.

An object of the invention is to measure the phase difference between the received color burst and the transmitted color burst without resorting to a separate source of color phase reference frequency signal.

Another object of the invention is to provide a circuit arrangement for measuring the phase error between the incoming and outgoing color bursts and automatically bringing the two bursts into a desired phase relationship.

A further object of the invention is to provide a phase detector which will measure the phase between two signals both of which may be varying over a relatively wide band of frequencies.

According to the invention a color burst monitor is arranged to compare phase relationship between the incoming and the outgoing color bursts with an error or reference phase difference, which is the phase difference measured between identical portions of the modulated subcarrier wave present in the incoming and the outgoing composite video signal. This reference phase difference is substantially brought about by the phase detecting circuitry and is the phase error of the circuitry by which the phase measurement is made. By arranging the color phase monitor according to the invention to operate down to a very low value of reference signal level before the phase monitor ceases to function, the reproduced image will be sufficiently grey in hue as to appear to be monochrome, in which case the phase of the color burst is quite unimportant and by maintaining a short time constant in the phase adjusting circuitry the required phase lock will be re-established in a very short time after color reappears in the image.

According to the invention one input circuit of a phase detector is connected to the output circuit of video signal translating apparatus. The other input circuit of the phase detector is connected to the input circuit of the apparatus through a device delaying the signal for an interval corresponding to the delay of the composite signal through the video signal translating apparatus. The output of the phase detector is effectively switched on during the color burst interval and during another interval occurring at some time in the video image signal portion. The latter interval will be referred to as the reference interval. Potentials are established in proportion to the phase differences between the incoming and outgoing signals during the burst and reference intervals and an output circuit is arranged either to indicate the difference between the established potentials for interpretation of the phase difference between the incoming and outgoing color bursts or to translate the difference between the established potentials to the local subcarrier oscillator control circuit for automatically bringing the outgoing color burst into phase coincidence with the incoming color burst.

According to the invention such a phase detector having two wide band input circuits, comprises a differential amplifier and a further amplifier connected in the cathode circuit of the differential amplifier. A phase shifting circuit for shifting the phase of one input voltage by substantially 45 degrees is connected to one input and a phase shifting device for shifting the other input signal by 45 degrees in the opposite direction is connected to the other input. The instantaneous voltages at the output of the differential amplifier are derived at a difference of 90 degrees and will remain close to this difference for very substantial changes in input frequency. By overdriving the input circuits of the two amplifiers to obtain non-linear operation, substantially rectangular waveforms of current are passed and the low frequency or direct component of the difference in potential at the output of the differential amplifier will be proportional to the phase angle. With linear operation of the amplifiers the instantaneous potential at one of the outputs of the differential amplifier with respect to fixed neutral or reference potential will be proportional to the sum of the instantaneous voltages at the input circuits and the instantaneous potential at the other of the outputs of the differential amplifier again with respect to fixed neutral or reference potential will be proportional to the difference between the input voltages. The output voltages are then demodulated by known circuitry and the output from such a demodulator then provides an indication of a phase difference between the two input voltages.

In order that the advantages of the invention may be fully appreciated and readily obtained in practice, an embodiment of the invention, given by way of example only, is described with reference to the accompanying drawing in which.

Figures 1, 2:
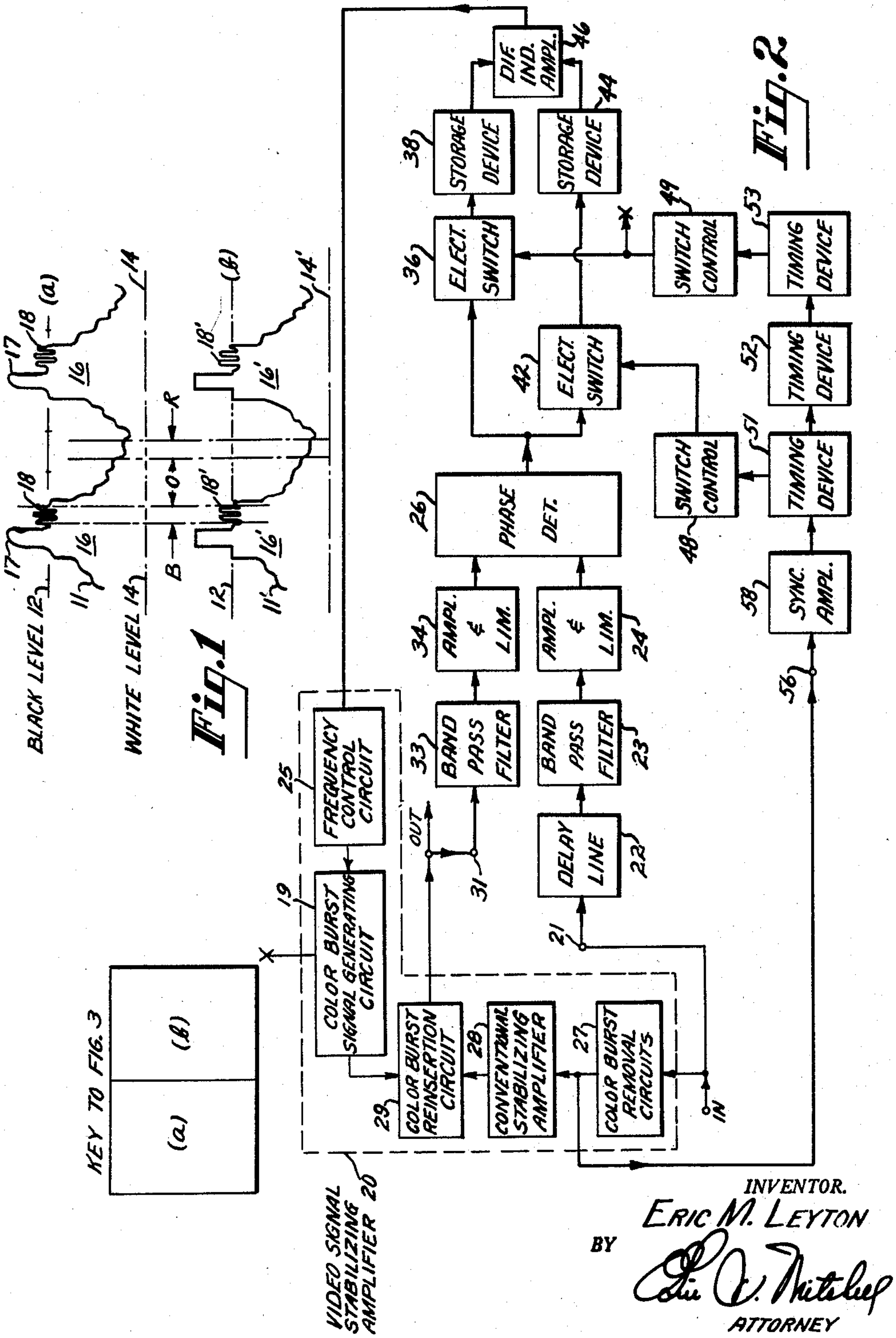
Fig. 1 is a graphical representation of waveforms useful in explanation of the operation of the invention.
Fig. 2 is a functional diagram of a phase detecting and adjusting arrangement according to the invention.
Figures 3A, 4, 5:
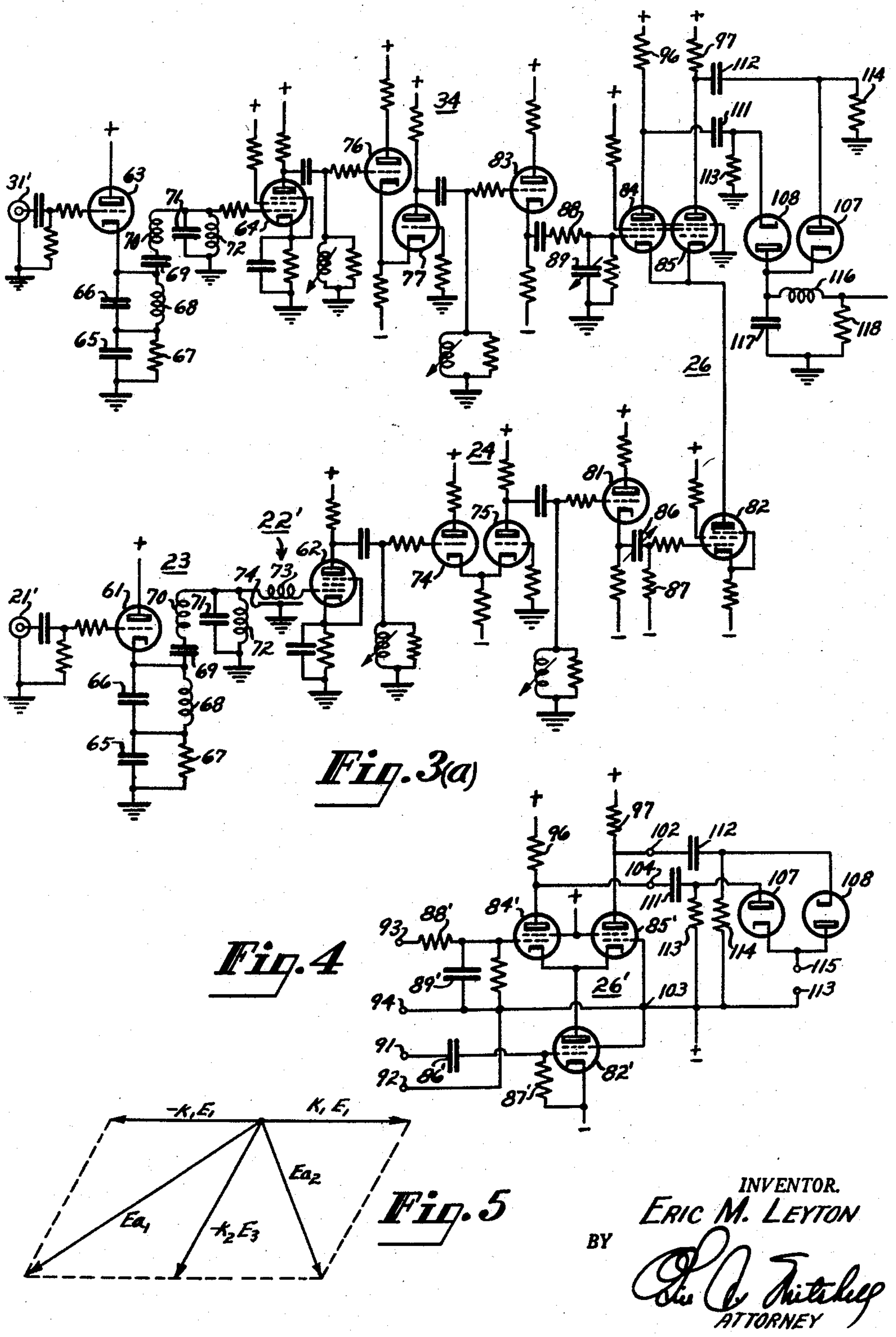
Figure 3B:
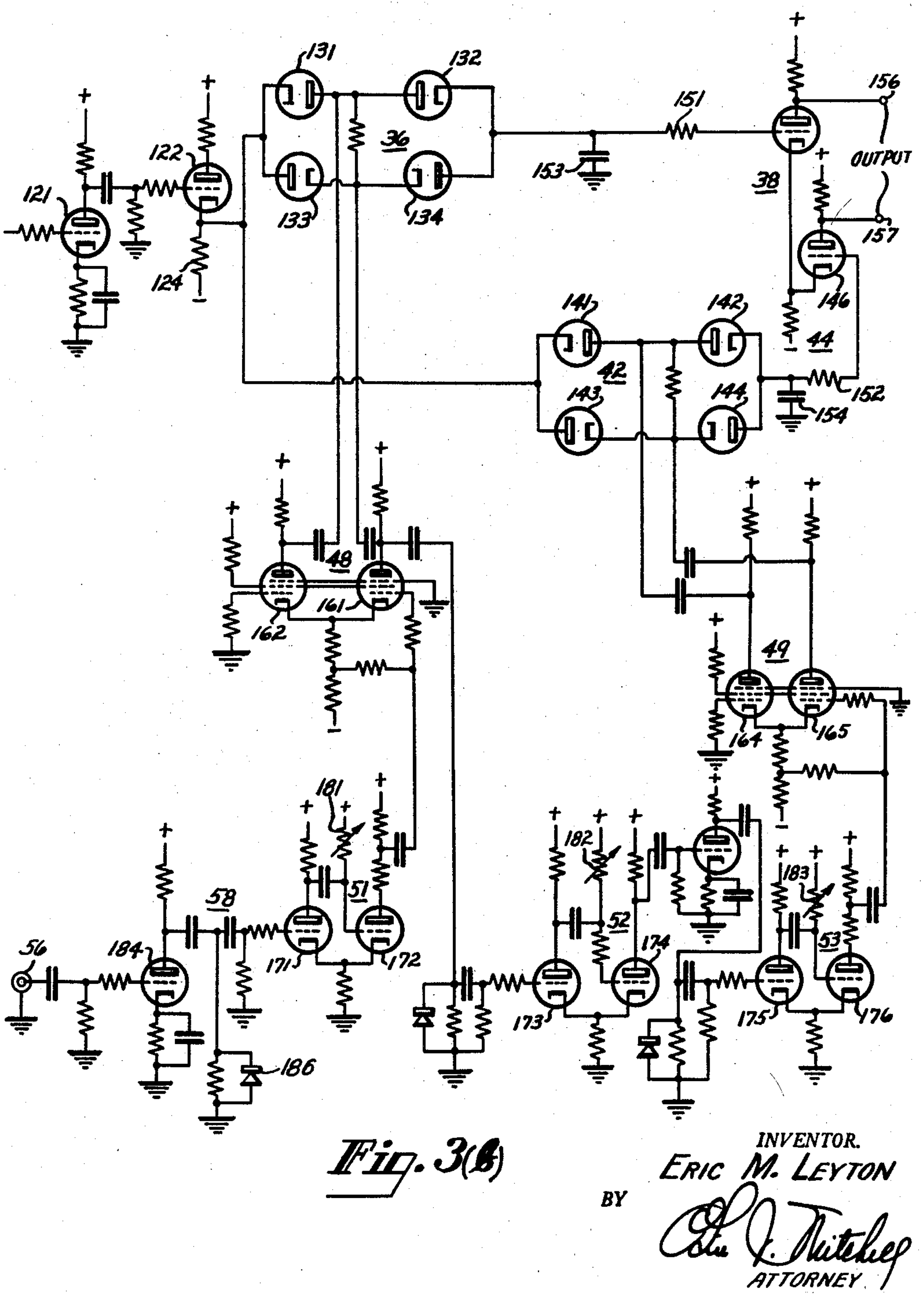

Fig. 3 (Sections 3(*a*) and 3(*b*) being taken together) is a schematic diagram of circuitry for performing the functions outlined by the diagram of Fig. 2;

Fig. 4 is a simplified schematic diagram of a phase detector according to the invention; and Fig. 5 is a vector diagram useful in explaining the phase detector shown in Fig. 4.

A graphical representation of waveforms of composite video signals typically found in color television transmission systems with which the invention is primarily concerned is given in Fig. 1. An incoming composite color signal is shown in Fig. 1(*a*) while the desired outgoing signal is shown in Fig. 1(*b*). The two waves are drawn to approximately the same amplitude scale in order that the functioning of the circuitry according to the invention may be more clearly understood, it being realized that in the usual case there would probably be a considerable difference in amplitude. In the conventional video signal stabilizing amplifier the incoming signal is separated at the black level on an amplitude basis and the synchronizing pulses are amplified and reshaped in one channel of the stabilizing amplifier while the image information appearing below the black level is amplified in another channel. The color burst which is added to the composite color signal wave immediately following the synchronizing pulse and at the black level is badly distorted by the separating action and, in at least one type of stabilizing amplifier, a new color burst is inserted in the composite color signal at the output of the stabilizing amplifier. In order to properly effect reproduction of the image at the receiver the inserted color burst must be in the same phase as the received color burst.

In Fig. 1 there are shown two waveforms representative of a composite color signal as might be applied to the input of a video signal translating apparatus shown in Fig. 1(*a*) and as might be obtained at the output of that apparatus as shown in Fig. 1(*b*). The image to be reproduced is transmitted in the portion of the waveform

11 lying between a black level 12 and a white level 14. Between intervals conveying image information are blanking intervals 16 upon which are superimposed horizontal synchronizing pulses 17 in the extrablack region following which are approximately 9 cycles of sine wave appearing above and below the black level 12 and referred to as the color burst. At the output of the video signal translating apparatus the waveform may appear as shown in Fig. 1(*b*) where the image information portion 11' is substantially the same as the input wave portion 11 except for amplification and the synchronizing pulses 17' are squared up as well as amplified. At the present time it is considered more desirable to reinsert a new color burst 18' which must be in the proper phase relationship to the received color burst 18. In order that this new color burst be generated in the proper phase, it is necessary to know the difference in phase between the incoming and the outgoing color bursts. In the case of a video signal of waveform as shown in Figs. 1(*a*) and (*b*), the signals to be measured are varying over rather wide frequency bands. The prior art phase detectors are limited to one input of relatively wide band width and another input, commonly termed the "reference" input, of relatively narrow bandwidth. Usually a source of reference oscillations is required for applying a reference phase to the narrow band input.

Referring to Fig. 2 there is shown a functional diagram of apparatus for determining the phase difference between an incoming color burst 18 and an outgoing color burst 18' and for properly phasing the two color bursts. An example of a primary use for a circuit arrangement according to the invention is a video signal stabilizing amplifier 20 to which an input wave such as shown in Fig. 1(*a*) is applied and from which there is derived an output wave of the form shown in Fig. 1(*b*). The stabilizing amplifier 20 may include color burst removal circuits 27 similar to those described in the copending application of R. C. Kennedy, filed June 16, 1953, now U.S. Patent No. 2,751,431, which is assigned to the assignee of the present invention. The output of the burst removal circuits 27 is coupled to a conventional stabilizing amplifier 28 which may be of the RCA Type Model TA-5B described at page 34 of "Broadcast News" for May 1948, or other suitable black and white stabilizing amplifier. Such a stabilizing amplifier 20 may also incorporate a color reference signal generating circuit 19, the frequency of which is controlled by a frequency control circuit 25 which is responsive to changes in direct current or direct potential obtained from a phase detector to vary the frequency of the color reference signal generating circuit 19 and where the change in frequency represents only a part of a cycle to effectively vary the phase of the output wave. The color burst signal generating circuit 19 may be an oscillator, the output of which is coupled through a gating device that operates to pass the requisite number of cycles of the color subcarrier frequency. The gating device may be similar to that described in the said Kennedy patent. The gating signal may be derived from the switch control 49 (described below) through the lead denoted *x—x*. The output of the conventional stabilizing amplifier 28, along with the output of the color burst signal generating circuit 19, is coupled to a color burst reinsertion circuit 29 which may be a circuit similar to that described in said Kennedy patent. In general, such stabilizing amplifier 28 includes circuits for suitably amplifying the video signal, for restoring the synchronizing pulses to their proper shapes and amplitudes by means of a "stretching" or equivalent circuit, and for otherwise modifying the waveform of the composite signal for the correction of any distortion therein. The signals at the input and output terminals of the video signal stabilizing amplifier 20 also are applied respectively by means of sampling circuitry comprising a delay line 22, a bandpass filter 23 and an amplifying and limiting circuit 24 in a desired concatenation to one input of a phase detector 26 and by means of a bandpass filter 33 and an amplifying and limiting circuit 34 to the other input of the phase detector 26. The time delay device 22 is arranged to have substantially the same time delay as that encountered by the wave traveling from the input to the output terminals of the video stabilizing amplifier 20. The filtering and limiting circuits 33 and 34 may be, and preferably are, identical to the filtering and limiting circuits 23 and 24 respectively. These circuits have a passband of about 1 megacycle centered about the chrominance subcarrier center frequency, or the frequency of the color burst. If the input and output signals are not within an amplitude ratio of 2:1 additional amplification may be introduced to the input sampling circuitry, which additional amplification may be provided by conventional video frequency amplifying circuitry. The output of the phase detector 26 will provide an indication of the instantaneous phase relationship between the input and the output signals plus any error in measuring the phase difference. During the image information portion 11, 11' an output will be obtained from the phase detector 26 which corresponds to the phase error in the measuring equipment only, since the phase difference between the two chrominance subcarrier waves is zero at this time. During the color burst interval, which burst interval B is indicated in Fig. 1, the output of the phase detecting circuit 26 should be the same as that obtained during the reference interval R. If the phase of the new outgoing color burst is not the same as that of the incoming color burst, the output of the phase detecting circuit 26 will be different during the burst interval B. The direction and magnitude of the difference between the two phase readings will be a measure of the magnitude and direction of the difference in phase between the color bursts. With the arrangement shown in Fig. 2, any variation or misadjustment of the various circuits of the phase detector is of minor importance since the signals travel the same paths and involve the same error during both burst and reference intervals, and only the direct component of the phase detector output voltage is changed without producing an erroneous reading at the null point. A direct potential proportional to the absolute phase deviation is obtained by applying the output voltage of the phase detecting circuit 26 during the burst interval through electronic switching circuitry comprising an electronic switching circuit 36 to a charge storing circuit 38 and by applying the output of the phase detecting circuit 26 during the reference interval through another direct electronic switching circuit 42 to another charge storing circuit 44. A difference indicating and/or translating circuit 46 is connected to the charge storing circuits 38 and 44. This difference circuit 46 may comprise a direct potential meter or similar indicating instrument, the reading of which indicates the magnitude and direction of the phase error, and may comprise an amplifying circuit and/or a translating circuit for applying a direct potential proportional to the magnitude and direction of the phase difference to the frequency controlling circuit 25 of the video signal stabilizing amplifier 20. In this way the output of the color burst generating circuit 19 may be made to produce a color burst which is in phase with the incoming color burst 18.

The electronic switching circuits 36, 42 may be triggered by any known timing means, one example of which is shown in Fig. 2. Switch controlling circuits 48, 49 are driven in time sequence by a plurality of timing devices 51, 52, 53 arranged to turn the electronic switching circuit 36 on only during the burst interval and the electronic switching circuit 42 on only during the reference interval. The timing devices 51–53 are initially controlled by a synchronizing pulse obtained from from the video signal stabilizing amplifier 20 and applied at the pulse input terminals 56 of a synchronizing pulse amplifying circuit 58. Other means of obtaining an initiating timing pulse may, of course, be used with equal success.

A schematic diagram of practical circuitry for carrying out the functions outlined in Fig. 2 is given in Fig. 3. The input terminals 21', 31' are connected to the grids of cathode follower tubes 61, 63. Pentode amplifying tubes 62, 64 are coupled to the cathodes of the cathode follower tubes 61, 63 respectively by bandpass filter circuits having component parts 65–72 which are identical for both filters. A delay line 22' is preferably constituted by a length of delay line cable having a series inductance component 73 and a shunt capacitance component 74. The cable is cut to a length at which the signal at the input terminals of the stabilizing amplifier 20 is delayed for the same amount of time as the signals passing through the stabilizing amplifier 20 are delayed. As shown, the delay line 22' is interposed in the circuit between the cathode of the cathode follower tube 61 and the control grid of the amplifier tube 62, although it could be inserted elsewhere if desired. In some instances it may be advantageous to use somewhat more complex bandpass filter in order to provide greater attenuation outside the passband of the filtering circuit. The filtering circuits are required to prevent the low frequency components of the video signal from reaching the phase detector. This is of considerable importance in the example of the stabilizing amplifier shown since the low frequencies may be distorted by the limiters and produce frequencies which adversely affect the phase detector. The filtering circuits are required to pass only the chrominance subcarrier or including the near sidebands out to about plus or minus 0.5 mc., which is the minimum band that will pass the required information to the phase detecting circuit 26. Because color remains visible in a color television image until the amplitude of the chrominance sub-carrier has fallen to about 3% of the maximum value, the filtering circuits must have a high attenuation at low frequencies. Furthermore no low frequencies should be allowed to pass to the limiting circuits and be subsequently limited so that the harmonic frequencies then fall inside the passband of the remainder of the circuits. Components of the video signal which lie within the passband of the filtering circuits but which are not due to the chrominance sub-carrier will also reach the phase detecting circuit 26. These components are just as useful for providing a phase comparison. In fact, if these components were of sufficient amplitude, the phase monitor would continue to function even when there is no chrominance subcarrier present in the image information portion of the video signal. Two dual triode tubes 74, 75, and 76 and 77 are connected in conventional cathode coupled amplifying and limiting circuitry to provide a bandwidth about the same as the bandpass filtering circuits 23, 33. The limiting circuits should supply a constant amplitude signal to the phase detecting circuit 26 even though the amplitude of the signal at the input terminals 21', 31' may vary by a ratio of 30:1. Cathode follower tubes 81, 83 are used to couple the output of the amplifying and limiting circuits 24, 34 to the control grids of the input phase detector tubes 82, 84. One phase detector tube 82 is connected in the common cathode circuit of two other phase detector tubes 84, 85 connected essentially in a differential amplifier circuit. An adjustable series capacitor 86 and a fixed shunt resistor 87 are used to couple the follower tube 81 to the grid of the phase detector tube 82, whereas a series fixed resistor 88 and an adjustable capacitor 89 are used to couple the other follower tube 83 to the phase detector tube 84. The resistors 87 and 88 are of the same value and the adjustable capacitors 86, 89 are each adjusted to provide 45 degrees phase shift at the chrominance subcarrier frequency. The voltages on the grids of the detector tubes 82, 84 will differ in phase by 90 degrees and will continue to differ close to 90 degrees even with substantial changes in input frequency.

A more detailed explanation of the operation of the phase detector 26' is given in connection with the simplified schematic diagram of Fig. 4, and the vector diagram of Fig. 5. One wide band signal is applied between a pair of terminals 91, 92, the latter of which is connected to a point of neutral potential through the grid circuit comprising the series capacitor 88 and the shunt capacitor 86' and 87' of the phase detector tube 82'. The other wide band signal is applied at the other pair of input terminals 93, 94 coupled to the grid of the phase detector tube 84' by means of a series resistor 88' and a shunt capacitor 89' and connected to the point of neutral potential respectively. The two signals go directly to the grid circuits of the phase detector tubes 82' and 84' which circuits do not involve bandwidth problems. Load resistors 96 and 97, are made low in order to provide wide band operation, and which may be supplemented by high frequency peaking coils if necessary, are substantially equal to the anode load of the phase detector tube 82 which is effectively the cathode input resistor of the other phase detector tubes 84', 85'. For conventional tubes this cathode impedance will be of the order of 100 ohms, whereby this part of the circuit will also have considerable bandwidth.

This type of phase detector may be operated in one mode by placing signals of large amplitude on the two input grids so that the tubes operate in a nonlinear manner. The circuit for this type of operation is shown in Fig. 4 up to the terminals 102 and 104. If the input signals are sufficiently large, the tubes 82', 84' and 85' will act in substantially the same way as a switch; being either fully conducting or completely cut off so that they will pass rectangular waveforms of current. Under these circumstances the output voltage, which is the low-frequency or D.C. component of the anode voltage on the tubes 84' and 85', will be proportional to the phase angle $\theta$ between the input waves.

Thus between the terminals 101 and 102 and terminal 103, which is at the point of neutral potential, there appears a low frequency or direct component of anode voltage of the tubes 84' and 85' which is proportional to the phase angle $\theta$ between the potentials applied to the input terminals 91, 92 and 93, 94.

In a second mode of operation the tubes are operated in the linear region of the characteristic and the angle $\theta$ is determined in an amplitude demodulating circuit, the demodulating circuit comprises a pair of diode elements shown as high vacuum diodes 107, 108 coupled to the phase detector tubes 84', 85' by means of capacitors 111, and 112 and load resistors 113 and 114. A direct potential proportional to the phase angle $\theta$ between the input voltages is thus produced between the output terminal 115, and the terminal 113.

The phase detecting circuit 26 then functions in the following way, provided the amplitudes of the two input signals remain constant. Any signal $E_1$ applied to the grid of the tube 84' will produce a signal at the anode of the tube 84' of amplitude equal to $-K_1E_1$ where $K_1$ is a constant depending on the gain of the tubes, and so on. Similarly the signal on the anode of the tube 85' due to $E_1$ will be $+K_1E_1$. Now the signals on the anodes of the tubes 84' and 85' due to the input $E_3$ will be the same and equal to $-K_2E_3$ where $K_2$ is also a gain constant not necessarily equal to $K_1$. The actual signals $E_{a1}$ and $E_{a2}$ on the anodes of the tubes 84' and 85' will be the vector sum of the signals due to the two inputs $E_1$ and $E_3$ as shown in Fig. 5. It follows that:

$$E_{a1}=(K_1E_1)^2+(K_2E_3)^2+2K_1E_1K_2E_3 \cos \theta$$

and $$E_{a2}=(K_1E_1)^2+(K_2E_3)^2-2K_1E_1K_2E_3 \cos \theta$$

It is arranged that $E_1K_1=K_2E_3$, whereby we have $$E_{a1}=2E_1K_1 \cos \theta/2$$

and $$E_{a2}=2E_1K_1 \sin \theta/2$$

Referring again to the schematic diagram of Fig. 3, the instantaneous voltage at the anode of the phase detecting tube 84 is proportional to the sum of the instantaneous voltages at the grids of the phase detecting tubes 82, 84 whereas the voltage at the anode of the other differential detecting tube 85 is proportional to the instantaneous difference between the grids of the other phase detecting tubes 82, 84. The two anode voltages are demodulated by means of the diodes 107, 108 and the output voltage from the amplitude demodulator is then an indication of the phase difference between the two input voltages. The output voltage across the grid resistor 118 is amplified in a triode amplifier tube 121 the anode of which is coupled to the grid of the cathode follower tube 122. If desired, several stages of amplification may be used at this point. The cathode follower tube 122 provides a low impedance output for suitable application of the phase indicating voltage across the cathode resistor 124 by the electronic switching circuits 36 and 42. The electronic switching circuits 36, 42 each comprise four diode elements shown as high vacuum diode tubes 131–134 and 141–144. It is suggested that conventional bidirectional conducting switch circuitry using triode tubes could be substituted with good results. The switching circuits 36, 42 are connected to the grids of triode tubes 145, 146 arranged in a known differential amplifier circuit. Time constant circuits comprising series resistors 151, 152 and shunt storage capacitors 153, 154 have such values that the time constant of the grid circuits is made long compared with the time period when the electronic switching circuit is open but is very short when the electronic switching circuit is closed. Thus a charge is stored in the capacitor 153 effective to produce a potential between the output terminal 156 and a point of neutral potential, or ground, which is proportional to the phase angle between the incoming and outgoing color bursts and a charge is stored in the capacitor 154 to produce a potential at the output terminal 157 proportional to the phase error angle measured during the reference interval R. The potential between the terminals 156 and 157 is therefore proportional to the phase difference of the color bursts and this potential may be applied to known circuitry for controlling the frequency and phase of known oscillators. This difference potential is sometimes referred to as the "phase error" but the distinction must be made between the phase error of the phase detector according to the invention and this phase difference voltage which is applied to the phase controlling circuitry.

An example of a translating circuitry for conveying the phase difference voltage to the stabilizing amplifier frequency-and-phase controlling circuit, is the amplitude demodulator comprising the diode elements 107, 108 the coupling capacitors 111, 112 and the load resistors 113 and 114 as shown in Fig. 4.

The electronic switching circuits 36, 42 are directly controlled by switch controlling circuits 48, 49.

These switch controlling circuits 48, 49 are amplifying and phase inverting circuits in which a positive pulse is applied to the grid of one of the tubes 161, or 165, to produce in conjunction with the other tube 162, or 166, a pair of pulses of equal amplitude and opposite polarity which render the switching tubes conducting but cancel each other from the switching circuit output. The positive and negative pulses required for triggering the control circuits 48, 49 are obtained from a chain of monostable reciproconductive circuits 41, 52, 53 comprising triode tubes 171–176.

As employed herein, the term "reciproconductive circuit" is construed to include all two tube regenerative circuit arrangements in which conduction alternates in one or the other tube. When considering the "free running" or "astable" circuit, the term is synonymous with the broad term "multivibrator," which term is herein limited to the astable reciproconductive circuit. The monostable reciproconductive circuit, which requires one triggering pulse to switch from the single stable state of conduction to the single quasi-stable state and return, it is occasionally referred to as a monostable-multivibrator and more often referred to as a trigger circuit though not consistently distinguishing from the bistable multivibrator. The bistable reciproconductive circuit, which is one requiring two triggering pulses to switch from one stable state to the other stable state and returning, is sometimes termed as "locking" circuit or "bistable" multivibrator.

These monostable reciproconductive circuits 41, 52, 53 are of conventional configuration and the period of the quasi-stable state of conduction may be adjusted by variation of the adjustable grid biasing resistors 181–183. Horizontal synchronizing pulses obtained from the video stabilizing amplifier 20 are applied at synchronizing input terminals 56′ to the grid of a synchronizing pulse amplifying tube 184 of the synchronizing pulse amplifying circuit 58. In some instances it may be desirable to use two or more stages of amplification at this point. Negative going pulses are eliminated by a diode element or semi-conductor device 186 and the positive going differentiated synchronizing pulses are applied to the grid of the input reciproconductive tube 171 which is arranged to produce positive and negative pulses by differentiation in the anode circuit of the output reciproconductive tube 172. Both of these pulses are applied to the input circuit of the reciproconductive circuit 161 to control the electronic switching circuit 36 to measure the phase between the color bursts. The intermediate reciproconductive circuit 52 is used to insure that the two switch controlling reciproconductive circuits 48, 49 are idle for a predetermined period after which time the final reciproconductive circuit 53 is triggered to control the electronic switching circuit 42 to measure the phase error during some portion of the image information period of the composite television signal.

A simpler circuit arrangement may be had by connecting the latter reciproconductive circuit 53 to the output reciproconductive tube 172 or the output reciproconductive tube 161 of the first switch controlling reciproconductive circuit 48 to determine the phase reference immediately after the phase between color bursts has been measured. It is suggested however that the results obtained with the system shown justifies the extra components in that careful timing is not required to insure that the two switching circuits change over at the exact time that each color burst terminates. The particular timing circuits shown are given as examples only since those skilled in the art will determine other timing circuits for other applications of the invention.

The system according to the invention may be extended by adding electronic switching circuits, switching controlling circuits, and timing circuits to obtain more than two phase readings for each cycle. Such an arrangement would be especially valuable in conjunction with test apparatus for determining the differential phase of complex wave translating apparatus such as video amplifiers and the like. A sawtooth wave modulated by a high frequency sine wave may be generated by a simple generating circuit and phase measurements made at different time intervals of the sawtooth wave, or a more complex generator such as disclosed in U.S. Patent No. 2,881,388, granted to William L. Behrend on April 7, 1959, and entitled "Television Test Signal Generator and Method of Use," may be employed and the timing may be simply extracted from the blanking pulses supplied by that generator.

Those skilled in the art will determine from the teaching herein the proper values of components to be used in applying the invention to practice but the values listed below which were used in a color burst phase monitor constructed along the lines of Fig. 3 are suggested as a convenient guide.

| Ref. No. | Component | Type of Value |
|---|---|---|
| 61, 62, 63, 64 | Bandpass tubes | 6U8. |
| 65 | Bandpass capacitor | 0.01 mf. |
| 66 | do | 600 mmf. |
| 67 | Bandpass resistor | 75 o. |
| 68 | Bandpass inductor | 3.6 μh. |
| 69 | Bandpass capacitor | 50 mmf. |
| 70 | Bandpass inductor | 44 μh. |
| 71 | Bandpass capacitor | 600 mmf. |
| 72 | Bandpass inductor | 3.6 μh. |
| 74, 75, 76, 77 | Limiter Tubes | 12AT7. |
| 81, 82, 83, 84 | Follower and detector tubes | 6AN8. |
| 85 | Detector tube | 1/S. 6AN8. |
| 86 | Phase shift capacitor | 5–25 mmf. |
| 87, 88 | Phase shift resistors | 3.3 ko. |
| 89 | Phase shift capacitors | 5–25 mmf. |
| 96, 97 | Load resistors | 4.7 ko. |
| 107, 108 | Demodulator tubes | 6AL5. |
| 111, 112 | Coupling capacitors | 150 mmf. |
| 113, 114 | Load resistors | 10 ko. |
| 116 | Detector choke | 36–64 μh. |
| 117 | Filter capacitor | 50 mmf. |
| 121 | Amplifier tube | |
| 122 | Follower tube | 12AT7. |
| 124 | Cathode resistor | 30 ko. |
| 131–134 | Switching diodes | 6AL5. |
| 141–144 | do | 6AL5. |
| 145, 156 | Differential amplifier tubes | 12AT7. |
| 151, 152 | Series resistors | 150 o. |
| 153, 154 | Storage capacitors | 47 mf. |
| 161, 162 | Reciproconductive tubes | 6AU6. |
| 165, 166 | do | 6AU6. |
| 171–176 | do | 12AT7. |
| 181–183 | Bias resistors | 0.1–1.1 Mo. |
| 184 | Synchronizing amplifier tube | 12AT7. |
| 186 | Semi-conductor | 1N34. |

The power supply delivered 200 volts positive between those points marked with a plus sign and the point of neutral potential, shown as ground, and 150 volts negative between those points marked with the minus sign and the point of neutral potential.

While transistors are not the equivalent of vacuum tubes, it should be recognized that the invention is concerned with novel circuitry and it should be understood that in most application those skilled in the art will be able to use transistors and like controlled electron flow path device circuitry to perform the same functions as are performed by the vacuum tubes and/or semiconductor devices in the circuit arrangement specifically shown in Figs. 3 and 4. Television signal circuit arrangements using transistor circuitry for video frequency amplifiers, germanium crystals for demodulators and so on have been successfully operated to translate video signal waves. In view of this, it is considered that additional transistor circuitry for performing the functions of the phase detecting circuitry according to the foregoing description will be readily determined by those skilled in the art without departing from the spirit and scope of the invention.

The invention claimed is:

1. A circuit arrangement for phasing the outgoing color burst produced by a color burst generating circuit in composite color signal wave translating apparatus, also having a synchronizing pulse translating circuit and a direct potential responsive generating control circuit coupled to said generating circuit, with the incoming color burst component of a composite color signal applied to the input of said apparatus, including a band-pass filtering circuit tuned to the color burst frequency and connected to the output of said translating apparatus, an amplifying and amplitude limiting circuit coupled to said filtering circuit, a phase detecting circuit having one input coupled to said amplifying and limiting circuit, another input and an output, another band-pass filtering circuit tuned to the color burst frequency, a time delay device and another amplifying and amplitude limiting circuit concatenated between the input of said translating apparatus and the other input of said phase detecting circuit, a circuit storing a charge as a measure of the phase difference between the input and the output of said translating apparatus and another circuit storing a charge indicative of the phase error of the phase detecting circuit arrangement, electronic switching circuitry coupling said charge storing circuits selectively to said phase detecting circuit, switching control circuitry coupled to said electronic switching circuitry, and a plurality of timing circuits coupled to said switching control circuitry and to said synchronizing pulse translating circuit to effect the coupling by said electronic switching circuitry during the measuring interval and during the reference interval, and a circuit coupled between said charge storing circuits and coupled to said generating control circuit of said translating apparatus, thereby to cause said generating control circuit to phase the color burst produced by said generating circuit with said incoming color burst.

2. A circuit arrangement for phasing the outgoing color burst produced by a color burst generating circuit in composite color signal wave translating apparatus, also having a synchronizing pulse translating circuit and a direct potential responsive generating control circuit coupled to said generating circuit, with the incoming color burst component of a composite color signal applied to the input of said apparatus, including a band-pass filtering circuit tuned to the color burst frequency and connected to the output of said translating apparatus, an amplifying and amplitude limiting circuit coupled to said filtering circuit, a phase detecting circuit having one input coupled to said amplifying and limiting circuit, another input and an output, another band-pass filtering circuit tuned to the color burst frequency, a time delay device and another amplifying and amplitude limiting circuit concatenated between the input of said translating apparatus and the other input of said phase detecting circuit, a circuit storing a charge as a measure of the phase difference between the input and the output of said translating apparatus and another circuit storing a charge indicative of the phase error of the phase detecting circuit arrangement, electronic switching circuitry coupling said charge storing circuits selectively to said phase detecting circuit, switching control circuitry coupled to said electronic switching circuitry, and a plurality of timing circuits coupled to said switching control circuitry and to said synchronizing pulse translating circuit to effect the coupling by said electronic switching circuitry during the measuring interval and during the reference interval, and an indicating circuit connected between said charge storing circuits to indicate the phase angle between said color phase reference signals.

3. A circuit arrangement for determining the phase relationship between incoming and outgoing signals applied to the input of and derived from the output of signal translating apparatus, including a phase detecting circuit having two inputs and an output from which is derived a direct potential proportional to the phase angle between the alternating potentials applied to the inputs, a circuit operatively associated with said phase detecting circuit to produce a potential indicative of the phase difference between inputs of said phase detecting circuit, and another circuit operatively associated with said phase detecting circuit to produce a potential indicative of the phase difference between said input and output signals and means effective to couple the inputs of said phase detector to the input and output of said translating apparatus and to couple the output of said phase detecting circuit to said phase difference potential producing circuits at different time intervals.

4. A circuit arrangement for determining the phase relationship between the color bursts of composite color signal applied to the input of and derived from the output of composite color signal translating apparatus of the type translating the color image signal substantially without phase change and reconstituting the color burst, including a phase detecting circuit having two inputs and an output from which is derived a direct potential proportional to the phase angle between the alternating potentials applied to the inputs, a circuit operatively associated with said phase detecting circuit to produce a potential indicative of the phase difference between inputs of said phase detecting circuit, and another circuit operatively associated with said phase detecting circuit to produce a potential indicative of the phase difference between said color bursts, and means effective to couple the inputs of said phase detector to the input and output of said translating apparatus and to couple the output of said phase detecting circuit to said phase difference potential producing circuits at one time interval coincident with the color bursts and at another time interval during the color image signal portion of the composite signals.

References Cited in the file of this patent

UNITED STATES PATENTS

| | | |
|---|---|---|
| 2,694,143 | Chambers | Nov. 9, 1954 |
| 2,703,380 | Fraser | Mar. 1, 1955 |
| 2,751,431 | Kennedy | June 19, 1956 |
| 2,774,038 | Stavis | Dec. 11, 1956 |